United States Patent
Hori et al.

(10) Patent No.: US 12,301,061 B2
(45) Date of Patent: May 13, 2025

(54) ROTOR OF ROTATING ELECTRICAL MACHINE AND ELECTRICAL DRIVE SYSTEM

(71) Applicant: Hitachi Astemo, Ltd., Hitachinaka (JP)

(72) Inventors: Masahiro Hori, Tokyo (JP); Takeshi Tokuyama, Tokyo (JP); Noriaki Hino, Tokyo (JP); Masanori Sawahata, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 285 days.

(21) Appl. No.: 18/019,058

(22) PCT Filed: May 10, 2021

(86) PCT No.: PCT/JP2021/017638
§ 371 (c)(1),
(2) Date: Jan. 31, 2023

(87) PCT Pub. No.: WO2022/034718
PCT Pub. Date: Feb. 17, 2022

(65) Prior Publication Data
US 2023/0283131 A1    Sep. 7, 2023

(30) Foreign Application Priority Data
Aug. 11, 2020 (JP) .................. 2020-135646

(51) Int. Cl.
*H02K 1/28* (2006.01)
*H02K 1/276* (2022.01)
(Continued)

(52) U.S. Cl.
CPC .............. *H02K 1/28* (2013.01); *H02K 1/276* (2013.01); *H02K 15/03* (2013.01); *H02K 15/12* (2013.01)

(58) Field of Classification Search
CPC .......... H02K 15/12; H02K 1/28; H02K 15/03; H02K 1/276; H02K 1/2766; H02K 1/2773; H02K 1/279; H02K 1/30; H02K 1/27
(Continued)

(56) References Cited

U.S. PATENT DOCUMENTS

| 2016/0359384 A1 | 12/2016 | Okamoto et al. |
| 2017/0317544 A1 | 11/2017 | Watanabe et al. |
| 2022/0216753 A1* | 7/2022 | Okamoto ............... H02K 1/276 |

FOREIGN PATENT DOCUMENTS

| JP | 2016-092984 A | 5/2016 |
| JP | 2017-060238 A | 3/2017 |

(Continued)

OTHER PUBLICATIONS

English Translation of International Search Report issued in corresponding International Application No. PCT/JP2021/017638, dated Jul. 20, 2021.

*Primary Examiner* — Alexander A Singh
(74) *Attorney, Agent, or Firm* — Foley & Lardner LLP

(57) ABSTRACT

An object of the present invention is to provide a structure capable of stably holding a bonded magnet into a magnet insertion part of a rotor core. A rotor of a rotating electrical machine includes a bonded magnet 112, an elastic member 113 having a bent part 113a, and a rotor core provided with a magnet storage part storing the bonded magnet 112 and the elastic member 113. The elastic member 113 is embedded in the bonded magnet 112 in a state where at least a part of the bent part 113a is exposed from the bonded magnet 112, and an exposed part 113c of the bent part 113a from the bonded magnet 112 comes into contact with an inner wall of the magnet storage part 114 and elastically deforms.

12 Claims, 13 Drawing Sheets

(51) Int. Cl.
*H02K 15/03* (2006.01)
*H02K 15/12* (2006.01)

(58) Field of Classification Search
USPC .......................... 310/156.01, 156.16, 156.17
See application file for complete search history.

(56) References Cited

FOREIGN PATENT DOCUMENTS

JP   2020-114077 A   7/2020
WO  WO-2015/146210 A1  10/2015

\* cited by examiner

ROTOR OF ROTATING ELECTRICAL MACHINE AND ELECTRICAL DRIVE SYSTEM

TECHNICAL FIELD

The present invention relates to a rotating electrical machine including a rotor and the rotor.

BACKGROUND ART

As a background art of the present technical field, an electric motor element described in JP 2017-60238 A (PTL 1) is known. The electric motor element of PTL 1 is a rotor in a form in which a bond magnet part is embedded therein is arranged by injection molding into a magnet-setting pit in a rotor core including a steel plate sheet laminate. The rotor of PTL 1 includes a close-contact point where a bond magnet part and a surrounding part around the bond magnet part are in close contact with each other, and an outside dimension shrinks as a molten material is cured because of a large shrinkage ratio of a bond magnet per se in the bond magnet part. To such configuration, the density and shrinkage ratio of the bond magnet part is controlled by changing an amount of resin components including, as a primary component, polyamide of a bond magnet composition used in the injection molding (see Abstract).

PTL 1 describes that a kneading temperature in a kneading process of rare earth-based magnet powder of a bonded magnet and a resin is set to a suitable temperature according to a type of a resin contained in the bonded magnet, and a kneading temperature in the case of a polyamide resin is about 250° C. (see Paragraph 0024).

CITATION LIST

Patent Literature

PTL 1: JP 2017-60238 A

SUMMARY OF INVENTION

Technical Problem

When a bonding material is a material compatible with high temperature, it is necessary to raise the temperature during injection molding, and the performance of the magnet tends to decrease by raising the temperature during injection molding. When the bonded magnet is directly injection-molded into a magnet-setting pit (magnet insertion part) of a rotor core, thermal stress is generated in the rotor core due to a difference in thermal expansion coefficient between the rotor core and the magnet. Therefore, it is desirable to have a structure in which the bonded magnet is stably held in the magnet insertion part of the rotor core by a method different from the method of directly injection-molding the bonded magnet into the magnet insertion part of the rotor core.

An object of the present invention is to provide a structure capable of stably holding a bonded magnet into a magnet insertion part of a rotor core.

Solution to Problem

In order to achieve the above object, a rotor of a rotating electrical machine of the present invention includes: a bonded magnet; an elastic member having a bent part; and a rotor core provided with a magnet storage part that stores the bonded magnet and the elastic member, in which the elastic member is embedded in the bonded magnet in a state where at least a part of the bent part is exposed from the bonded magnet, and the exposed part of the bent part from the bonded magnet comes into contact with an inner wall of the magnet storage part and is elastically deformed.

Advantageous Effects of Invention

According to the present invention, the bonded magnet can be stably held in the magnet insertion part of the rotor core by a method different from the method of directly injection-molding the bonded magnet into the magnet insertion part of the rotor core.

Problems, configurations, and effects other than those described above will be made clear by the description of the following embodiment.

DESCRIPTION OF EMBODIMENTS

One example of the present invention will be described with reference to the drawings. In the following description, the radial direction of a rotor 110 of the rotating electrical machine 100 is indicated by r, the axis direction (rotation axis direction) of a rotation axis 101 of the rotor 110 is indicated by z, and the rotation direction of the rotor 110 is indicated by G. An axis (central axis) passing through the center of the rotation axis 101 is indicated by Ax. The radial direction r and the rotation axis direction z of the rotor 110 may be referred to as "radial direction" and "axis direction", respectively, for description. Since the rotation direction θ coincides with the circumferential direction about the central axis Ax, the rotation direction θ may be referred to as "circumferential direction" for description.

In the following description, there is a case where an up-down direction, a vertical direction, and a horizontal direction are designated for description, but these directions are directions set based on FIG. 2, and the up-down direction, the vertical direction, and the horizontal direction in a state where the rotating electrical machine 100 is mounted are not designated. The vertical direction is a direction along the axis direction z.

Example 1

The rotating electrical machine 100 according to an example of the present invention will be described with reference to FIGS. 1 to 3.

Figure 1:
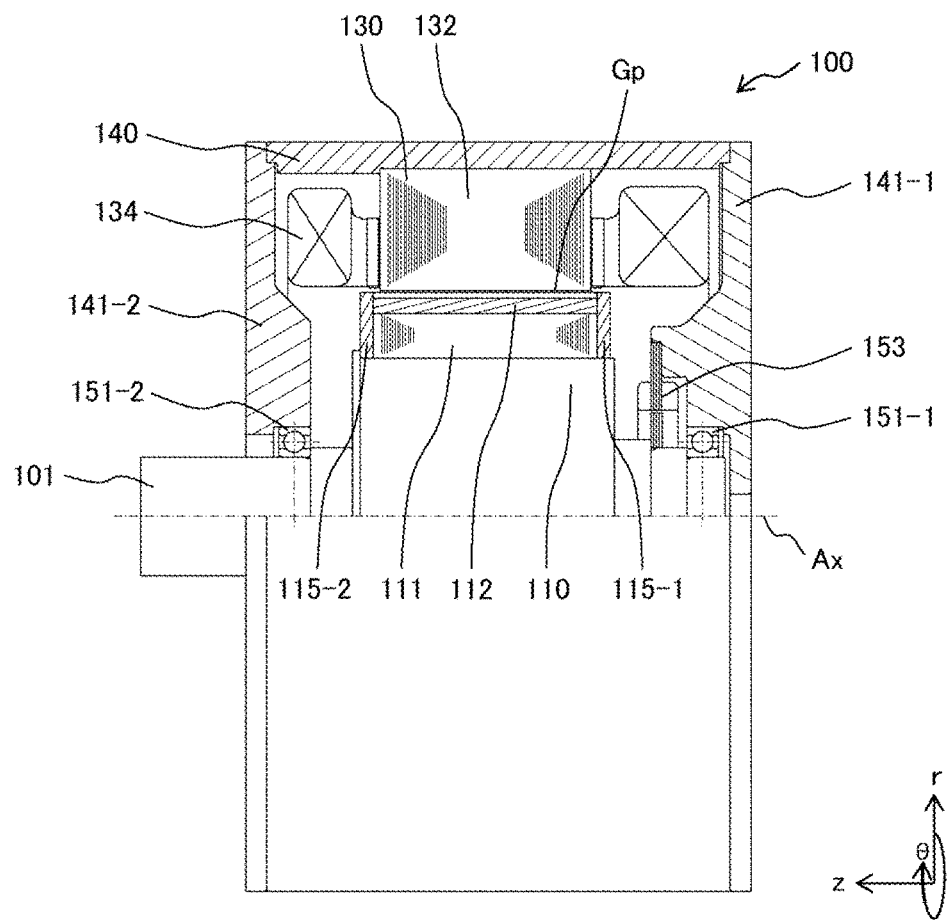
FIG. 1 is a cross-sectional view (r-z cross-sectional view) of a rotating electrical machine 100 according to the present invention, the cross-sectional view being parallel to a central axis Ax and including the central axis Ax.

FIG. 1 is a cross-sectional view (r-z cross-sectional view) of the rotating electrical machine 100 according to the present invention, the cross-sectional view being parallel to the central axis Ax and including the central axis Ax. FIG. 2 is a transparent perspective view illustrating an inside of the rotor core 111 according to the present invention in a partially cut-out manner in the circumferential direction. FIG. 3 is a top view of the bonded magnet 112.

In the rotating electrical machine 100 according to the present example, a permanent magnet 112 integrated with the elastic member 113 is inserted into and fixed to a magnet insertion pit 114 of the rotor core 111. The permanent magnet 112 is formed of a bonded magnet. As a method of integrating an elastic member with the bonded magnet 112, a method of embedding (insert molding) the elastic member 113 in the bonded magnet 112 is adopted.

The bonded magnet 112 is a magnet formed of a resin bonding material and magnet powder, and has a degree of freedom in shape of the magnet to be molded, and therefore it is possible to achieve a shape that is electrically close to an ideal shape in terms of strength. In particular, in the present example, the bonded magnet is suitable for embedding the elastic member 113.

The elastic member 113 is a member that generates a pressing force for pressing the bonded magnet 112 and holds the bonded magnet 112 on the inner wall (side surface) of the magnet insertion pit 114 by the pressing force. The elastic member 113 can be formed of a leaf spring or the like.

In the present example, the following effects can be achieved.

There will be less restriction in shape of the bonded magnet 112 by elastic member 113, and the degree of freedom of the shape of the bonded magnet 112 increases.

The elastic member 113 can be downsized, and the volume of the bonded magnet 112 can be increased.

Since the elastic member 113 serves as a buffer, a difference in thermal expansion between the bonded magnet 112 and the rotor core can be absorbed.

The rotating electrical machine 100 according to the present example is suitable for use as, for example, a motor for traveling of an electric vehicle that travels by power of only the rotating electrical machine or a hybrid electric vehicle that is driven by both an engine and the rotating electrical machine.

As illustrated in FIG. 1, the rotating electrical machine 100 includes a stator 130, the rotor 110, and a housing 140. The stator 130 is held inside the housing 140 and includes a stator core 132 and a stator winding 134. On the inner peripheral side of the stator core 132, the rotor 110 is rotatably disposed via a void Gp.

The rotor 110 includes the rotor core 111 fixed to the rotation axis 101, the multipolar permanent magnet (bonded magnet) 112, and a nonmagnetic end plates 115-1 and 115-2, and is rotatable about the rotation axis 101. The rotor core 111 has a role of configuring mainly a magnetic path and a strength member, and is formed by laminating thin plates in many cases. When the rotor core 111 is formed by laminating thin plates, the axis direction z coincides with the lamination thickness direction of the thin plates. The end plates 115-1 and 115-2 are structural members disposed at both ends in the axis direction of the rotor core 111 in order to fix in the axis direction the laminated steel plates forming the rotor core 111. The rotation axis 101 may also be referred to as drive axis or shaft.

The housing 140 has a pair of end brackets 141-1 and 141-2 provided with bearings 151-1 and 151-2 and a side surface part 141-3, and includes the stator 130 and the rotor 110. The rotation axis 101 is formed integrally with the rotor 110, and is rotatably held by the bearings 151-1 and 151-2.

In the present example, it is assumed that the rotating electrical machine 100 is driven by a three-phase alternating current. For this purpose, the rotation axis 101 includes a resolver 153 (rotation angle sensor) that detects a position and a rotation speed of a pole of the rotor 110. Based on the output from the resolver 153, a control signal and a drive signal for a power module not illustrated to perform switching operation are generated in a control circuit and a drive circuit that are not illustrated. The power module performs switching operation based on the drive signal, and converts direct-current power supplied from a battery 510 (see FIG. 17) into three-phase alternating-current power. This three-phase alternating-current power is supplied to the stator winding (coil) 134, and a rotating magnetic field is generated in the stator 130. The frequency of the three-phase alternating-current current is controlled based on the output value of the resolver 153, and the phase of the three-phase alternating-current current with respect to the rotor 110 is also controlled based on the output value of the resolver 153. In the stator winding 134, the U phase, the V phase, and the W phase are arranged in a predetermined order in the circumferential direction.

The configurations of the control circuit, the drive circuit, and the power module for generating the three-phase alternating-current power and the configuration of the stator winding (U-phase, V-phase, and W-phase) 134 can be implemented by applying a well-known technique.

The vicinity of the outer periphery of the rotor core 111 is provided with a plurality of the pits (magnet insertion pits) 114 for fixing the bonded magnets 112 along the circumferential direction. Since the magnet insertion pit 114 is a portion into which the bonded magnet 112 is inserted and stored, it will be called a magnet insertion part or a magnet storage part for description. The magnet storage part 114 is provided as a through pit extending in the axis direction z, and the bonded magnet 112 is embedded in the magnet storage part 114. The magnet storage part 114 may be provided as a pit that does not penetrate the rotor core 111 in the axis direction z.

Figure 2:
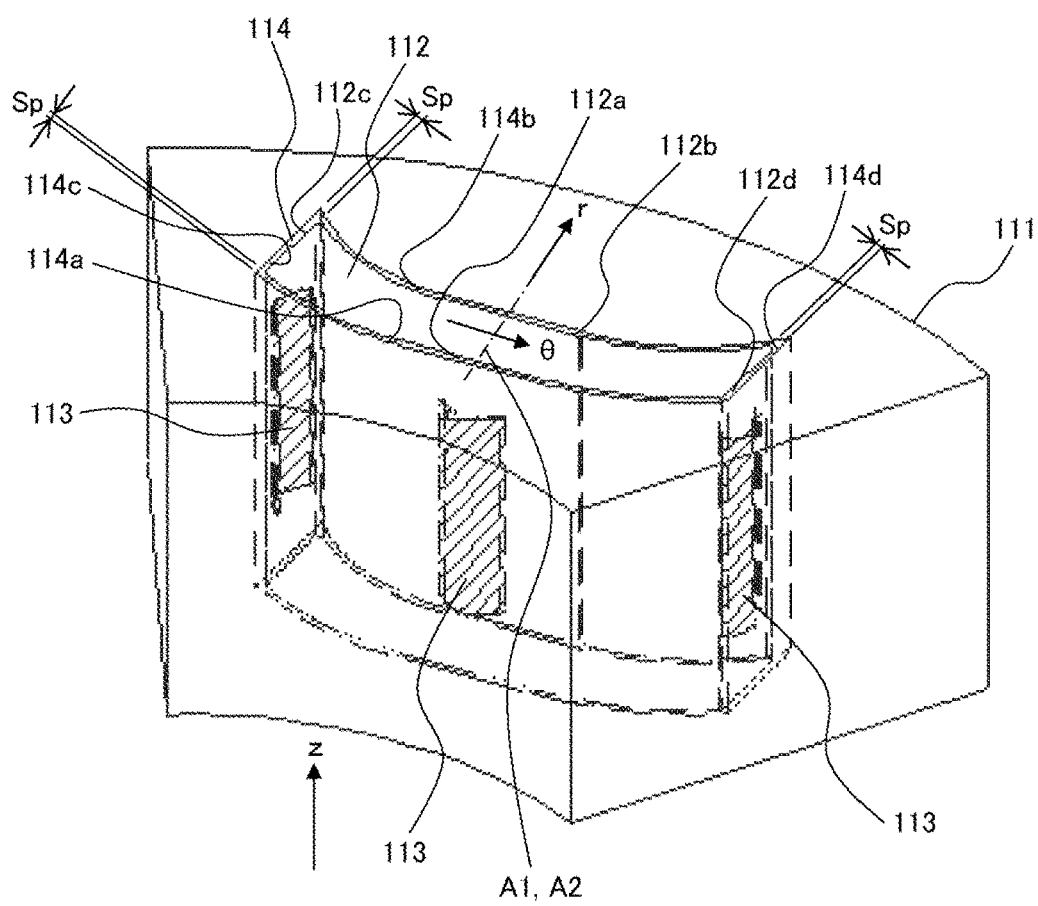
FIG. 2 is a transparent perspective view illustrating an inside of a rotor core 111 according to the present invention in a partially cut-out manner in the circumferential direction.

As illustrated in FIG. 2, the magnet storage part 114 has a shape (arc shape) in which a cross section (horizontal cross section) perpendicular to the axis direction z draws an arc. The upper opening surface and the lower opening surface of the magnet storage part 114 also have an arc-shaped horizontal cross section. For this reason, both side surfaces 114a and 114b of the magnet storage part 114 facing each other in the radial direction r have a curved shape in the circumferential direction θ. On the other hand, both side surfaces 114c and 114d of the magnet storage part 114 facing each other in the circumferential direction θ are formed by planes along the radial direction r. In the present example, the side surfaces 114c and 114d are parallel to a line segment A2 that passes through the center of the magnet storage part 114 in the circumferential direction θ and extends in the radial direction r.

The side surface 114a is a side surface formed on the radially inner side, and the side surface 114b is a side surface formed on the radially outer side.

Figure 3:
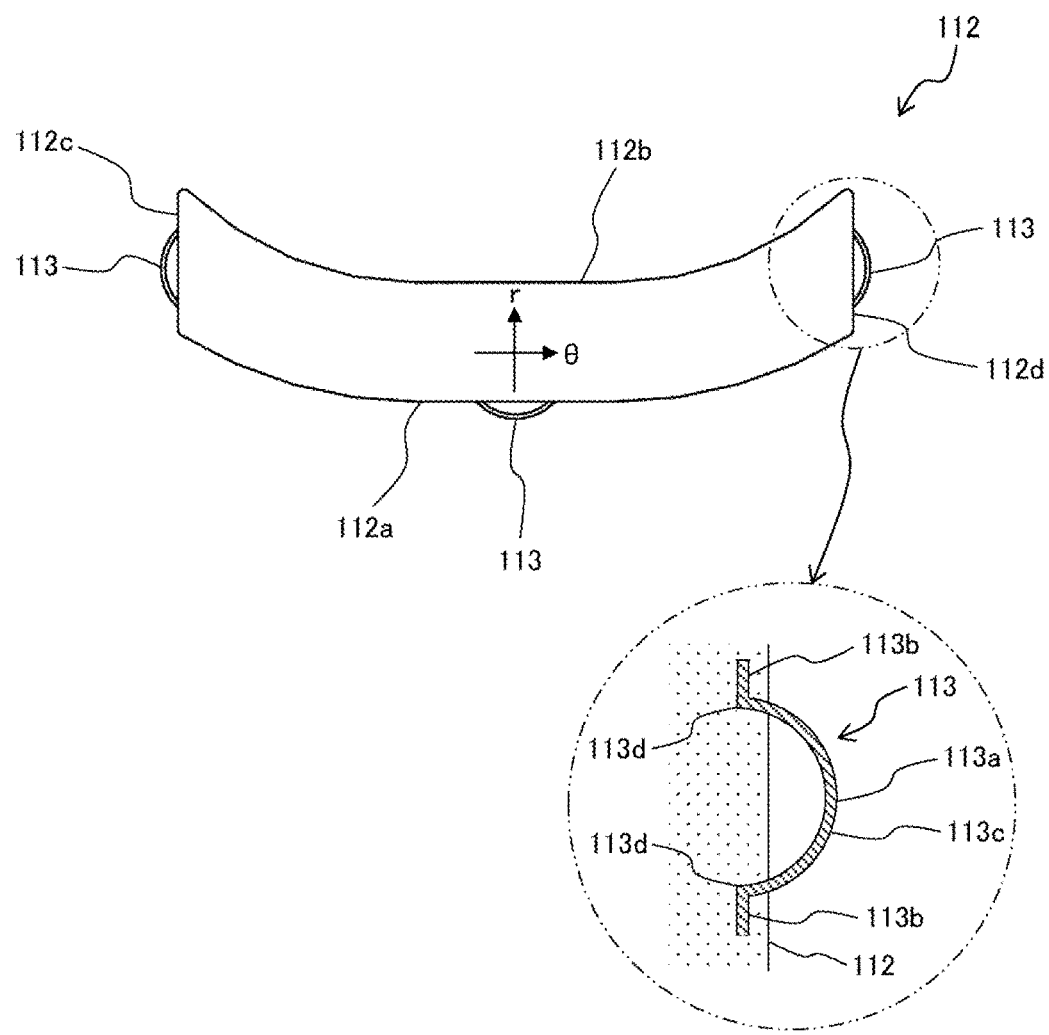
FIG. 3 is a top view of a bonded magnet 112.

As illustrated in FIGS. 2 and 3, the bonded magnet 112 has a shape (arc shape) in which a cross section (horizontal cross section) perpendicular to the axis direction z draws an arc. An upper end surface and a lower end surface of the bonded magnet 112 also have an arc-shaped horizontal cross section. Therefore, both end surfaces 112a and 112b of the bonded magnet 112 facing each other in the radial direction r have a curved shape in the circumferential direction θ. On the other hand, both end surfaces 112c and 112d of the bonded magnet 112 facing each other in the circumferential direction θ are formed of planes along the radial direction r. In the present example, the end surfaces 112c and 112d are parallel to a line segment A1 that passes through the center in the circumferential direction θ of the bonded magnet 112 and extends in the radial direction r.

The end surface 112a is an end surface located radially inside and facing radially inward, and the end surface 112b is an end surface located radially outside and facing radially outward.

The bonded magnet 112 is magnetized in the radial direction r illustrated in FIG. 1 such that the end surface 112a and the end surface 112b are an N-pole or an S-pole. Due to this, the end surface 112a and the end surface 112b constitute two surfaces facing each other in the magnetization direction, and the end surface 112c and the end surface 112d constitute two surfaces facing each other in a direction substantially perpendicular to the magnetization direction. Each of the end surface 112a and the end surface 112b constitutes a magnetic pole surface of the bonded magnet 112.

The shapes of the magnet storage part 114 and the magnet 112 are not limited to the shapes illustrated in FIGS. 2 and 3, and may be shapes different from the shapes illustrated in FIGS. 2 and 3.

A horizontal cross section of the magnet storage part 114 is larger than a horizontal cross section of the bonded magnet 112, and a gap Sp is formed between the side surface 114a of the magnet storage part 114 and the end surface 112a of the bonded magnet 112, between the side surface 114c of the magnet storage part 114 and the end surface 112c of the bonded magnet 112, and between the side surface 114d of the magnet storage part 114 and the end surface 112d of the bonded magnet 112. On the other hand, the side surface 114b of the magnet storage part 114 and the end surface 112b of the bonded magnet 112 are in contact with each other.

The elastic member 113 is provided so that the bonded magnet 112 is stably held in the magnet storage part 114. The elastic member 113 is provided on the end surface 112a, the end surface 112c, and the end surface 112d of the bonded magnet 112. That is, the elastic member 113 is disposed on the end surface 112a on the radially inner peripheral side of the bonded magnet 112 and both of the end surfaces 112c and 112d in the circumferential direction.

A centrifugal force is generated radially outward by the rotation of the rotor 110. In a case where the elastic member 113 is disposed on the end surface 112b side (outer peripheral side), the stress applied to the elastic member 113 changes each time the centrifugal force acting on the bonded magnet 112 changes due to a change in the rotational speed, and there is a possibility that the rotor core 111 breaks due to cyclic fatigue. By disposing the elastic member 113 radially inward and circumferentially, it is possible to reduce a change in stress due to a centrifugal force and to reduce cyclic fatigue of the rotor core 111.

The elastic member 113 of the end surface 112a forms the gap Sp between the side surface 114a of the magnet storage part 114 and the end surface 112a of the bonded magnet 112, and biases the bonded magnet 112 such that the side surface 114b of the magnet storage part 114 and the end surface 112b of the bonded magnet 112 come into contact with each other.

The elastic member 113 on the end surface 112c and the elastic member 113 on the end surface 112d bias the bonded magnet 112 such that the gap Sp is formed between the side surface 114c of the magnet storage part 114 and the end surface 112c of the bonded magnet 112 and the gap Sp is formed between the side surface 114d of the magnet storage part 114 and the end surface 112d of the bonded magnet 112.

In the present example, as illustrated in FIG. 3, the elastic member 113 is formed of a leaf spring having a bent part 113a in order to generate a pressing force for pressing the bonded magnet 112. The bent part 113a of the present example has a bend in the radial direction r or the circumferential direction θ. That is, the bent part 113a has a bend in a horizontal cross section including the radial direction r and the circumferential direction θ.

The elastic member 113 has the extension parts 113b provided along the end surfaces 112a, 112c, and 112d of the bonded magnet 112 at both ends of the bent part 113a. The extension part 113b is formed in a flat plate shape and is formed to be bent from the bent part 113a. In the present example, the extension part 113b extends in the radial direction r or the circumferential direction θ inside the bonded magnet 112.

Both ends and the extension part 113b of the bent part 113a constitute an embedded part 113d embedded in the bonded magnet 112. A part of the bent part 113a excluding the embedded parts 113d at both ends constitutes an exposed part 113c.

As described above, the rotor 110 of the rotating electrical machine 100 of the present example includes the bonded magnet 112, the elastic member 113 having the bent part 113a, and the rotor core 111 provided with the magnet storage part 114 that stores the bonded magnet 112 and the elastic member 113. The elastic member 113 is embedded in the bonded magnet 112 in a state where at least a part of the bent part 113a is exposed from the bonded magnet 112, and the exposed part 113c of the bent part 113a from the bonded magnet 112 elastically deforms in contact with the inner walls 114a, 114c, and 114d of the magnet storage part 114.

The elastic member 113 bends when the bonded magnet 112 is inserted into magnet storage part 114, and generates a pressing force for pressing the bonded magnet 112. By this pressing force, the bonded magnet 112 is held on the inner wall (side surface) of the magnet storage part 114.

Modified Example 1

Figure 4:
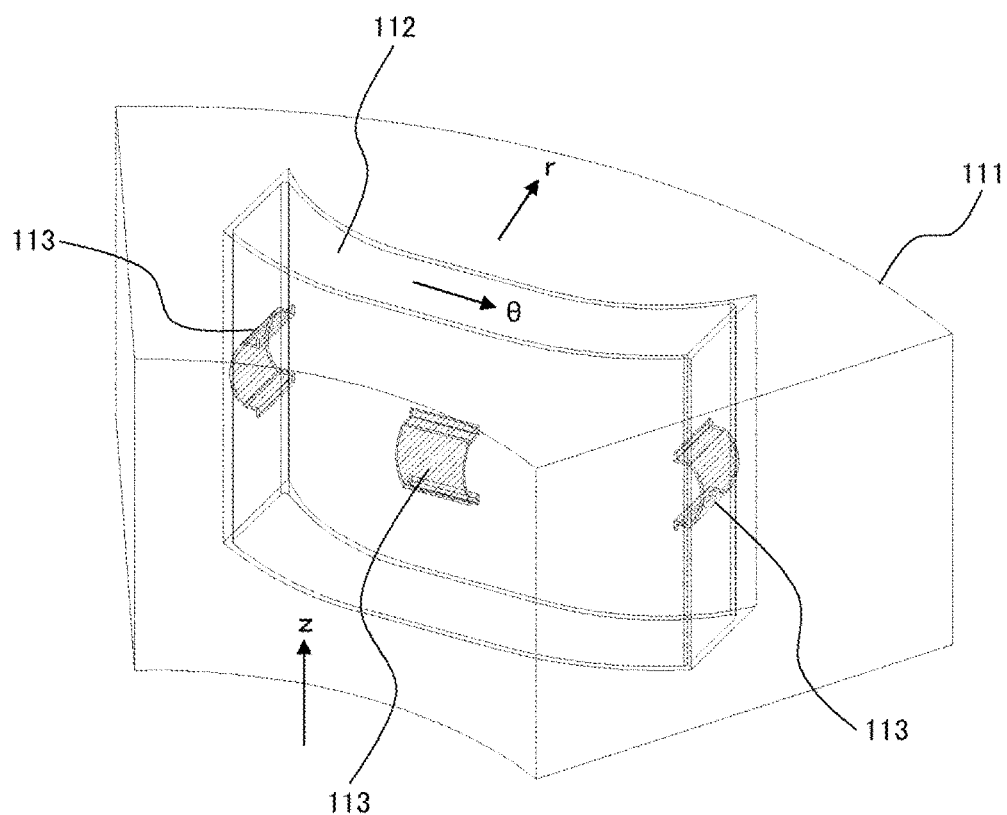
FIG. 4 is a transparent perspective view illustrating an inside of the rotor core 111 according to Modified Example 1 in a partially cut-out manner in the circumferential direction.
Figure 5:
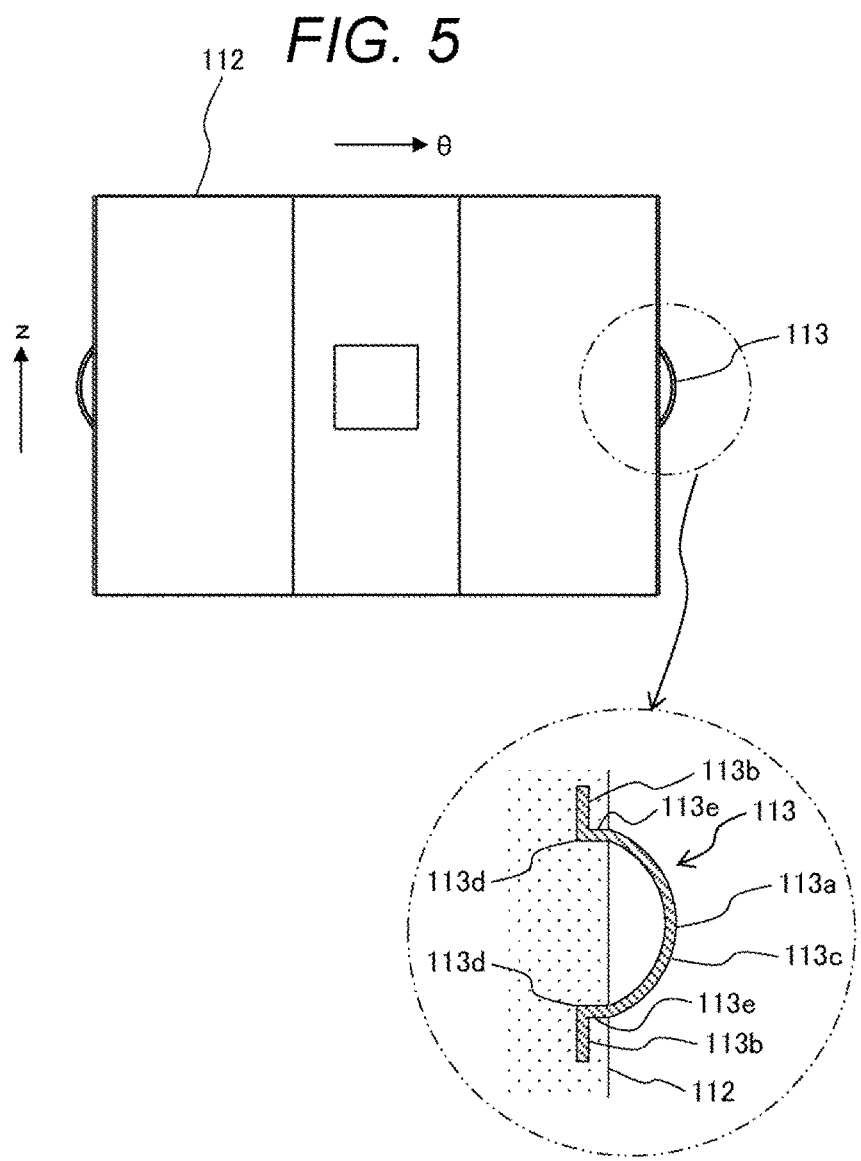
FIG. 5 is an external view of the bonded magnet 112 as viewed from a radially inside.

Next, a modified example (Modified Example 1) of the elastic member 113 will be described with reference to FIGS. 4 and 5. FIG. 4 is a transparent perspective view illustrating an inside of the rotor core 111 according to Modified Example 1 in a partially cut-out manner in the circumferential direction. FIG. 5 is an external view of the bonded magnet 112 as viewed from a radially inside.

In the present example, the shape of the elastic member 113 is different from the shape illustrated in FIGS. 2 and 3. Other configurations are the same as the configurations illustrated in FIGS. 2 and 3. The same reference signs are given to the same configurations as those of the above-described example, and redundant description will be omitted. In a case where there are different configurations even with the same reference signs, the different configurations will be described.

In the elastic member 113 of FIGS. 2 and 3, the bent part 113a has a bend in a horizontal cross section perpendicular to the axis direction z. On the other hand, the bent part 113a of the elastic member 113 of the present example has a bend in the axis direction z as illustrated in FIGS. 4 and 5. The elastic member 113 may be configured to have a bend in both the axis direction z and the horizontal cross section.

That is, the bent part 113a of the elastic member 113 may be configured to have a bend in the axis direction z, in the horizontal cross section perpendicular to the axis direction z, or in both the axis direction z and the horizontal cross section.

When the bent part has a bend in the axis direction z, the bent part serves as a buffer when the bonded magnet 112 is inserted into the rotor core 111, and it is possible to prevent the magnet from damaging the rotor core 111. When the magnet storage part 114 has a bend in the horizontal cross section, the shape of the bend can be matched with the shape of the magnet storage part 114 of the rotor core 111, and therefore the bonded magnet 112 can be positioned with respect to the magnet storage part 114 while preventing rattling when the bonded magnet 112 is inserted into the rotor core 111.

In the elastic member 113 of the present example, a straight part 113e linearly extending from the exposed part 113c toward the inside of the bonded magnet 112 is formed at both ends of the bent part 113a, and the extension part 113b provided along the end surfaces 112a, 112c, and 112d of the bonded magnet 112 is provided at an end of the straight part 113e. The extension part 113b of the present example extends in the axis direction z from the straight part 113e.

That is, the elastic member 113 has the extension parts 113b extending in the axis direction z inside the bonded magnet 112 at both ends. Extension in the axis direction can enlarge the contact surface between the elastic member 113 and the bonded magnet 112, reduce stress concentration, and prevent cracking and peeling of the bonded magnet 112.

The straight part 113e constitutes a flat plate portion formed in a flat plate shape. The extension part 113b is formed in a flat plate shape and is formed to be bent from the straight part 113e. In the present example, the embedded part 113d embedded in the bonded magnet 112 is constituted of the straight part 113e and the extension part 113b. The bent part 113a constitutes the exposed part 113c.

Also in the present example, the elastic member 113 is disposed on the end surface 112a on the radially inner peripheral side of the bonded magnet 112 and both of the end surfaces 112c and 112d in the circumferential direction.

Modified Example 2

Figure 6:
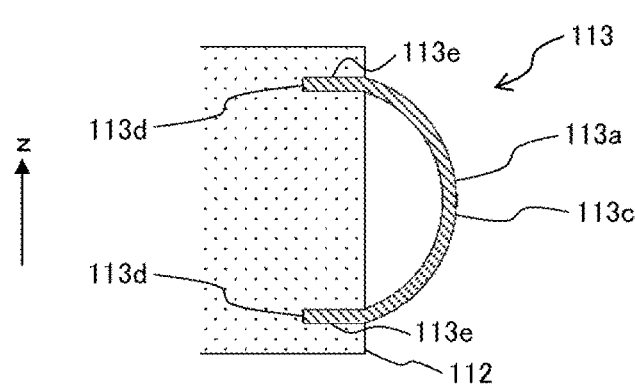
FIG. 6 is a cross-sectional view illustrating a cross section of the rotor core 111 according to Modified Example 2 in the vicinity of an elastic member 113.

Next, a modified example (Modified Example 2) of the elastic member 113 will be described with reference to FIG. 6. FIG. 6 is a cross-sectional view illustrating a cross section of the rotor core 111 according to Modified Example 2 in the vicinity of the elastic member 113.

In the present example, the configuration of the embedded part 113d of the elastic member 113 is different from that of Modified Example 1 of FIGS. 4 and 5. Other configurations are the same as those of Modified Example 1 illustrated in FIGS. 4 and 5. The same reference signs are given to the same configurations as those of the above-described example and modified examples, and redundant description will be omitted. In a case where there are different configurations even with the same reference signs, the different configurations will be described.

In the elastic member 113 of the present example, the straight parts 113e linearly extending toward the inside of the bonded magnet 112 in the circumferential direction are formed at both ends of the bent part 113a. The straight part 113e extends in one direction inside the bonded magnet 112. In the present example, the embedded part 113d embedded in the bonded magnet 112 is constituted of the straight part 113e, and the bent part 113a constitutes the exposed part 113c.

That is, in the present example, the elastic member 113 includes the exposed part 113c that includes at least a part of the bent part 113a and is exposed to the outside of the bonded magnet 112, and the embedded part 113d embedded in the bonded magnet 112, and the embedded part 113d extends in one direction inside the bonded magnet 112.

Since the embedded part 113d extends in one direction inside the bonded magnet 112, the direction of the stress applied to the bonded magnet 112 by the elastic member 113 becomes constant, and the bonded magnet 112 can be prevented from being broken or peeled at the joint part between the elastic member 113 and the bonded magnet 112.

The configuration related to the embedded part 113d and the straight part 113e of the present example can be applied to the elastic member 113 illustrated in FIGS. 2 and 3.

Modified Example 3

Figure 7:
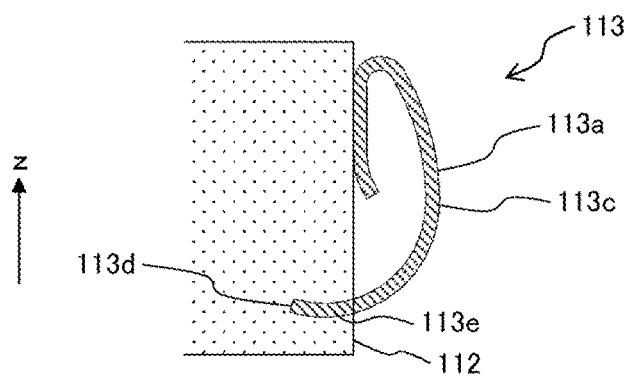
FIG. 7 is a cross-sectional view illustrating a cross section of the rotor core 111 according to Modified Example 3 in the vicinity of the elastic member 113.

Next, a modified example (Modified Example 3) of the elastic member 113 will be described with reference to FIG. 7. FIG. 7 is a cross-sectional view illustrating a cross section of the rotor core 111 according to Modified Example 3 in the vicinity of the elastic member 113.

In the present example, the configuration of the embedded part 113d of the elastic member 113 is different from that of Modified Example 2 of FIG. 6. Other configurations are the same as those of Modified Example 2 illustrated in FIG. 6.

The same reference signs are given to the same configurations as those of the above-described example and modified examples, and redundant description will be omitted. In a case where there are different configurations even with the same reference signs, the different configurations will be described.

In the present example, one end of the elastic member 113 is embedded in the bonded magnet 112, and the other end is exposed to the outside of the bonded magnet 112. That is, one end of the elastic member 113 is fixed by the bonded magnet 112, and the other end is not fixed by the bonded magnet 112. This can increase the deformation amount of the elastic member 113, and can increase a removal force. In the present description, the removal force is a force necessary for inserting and removing the bonded magnet 112.

The configuration related to the embedded part 113d and the straight part 113e of the present example can be applied to the elastic member 113 illustrated in FIGS. 2 to 5.

Modified Example 4

Figure 8:
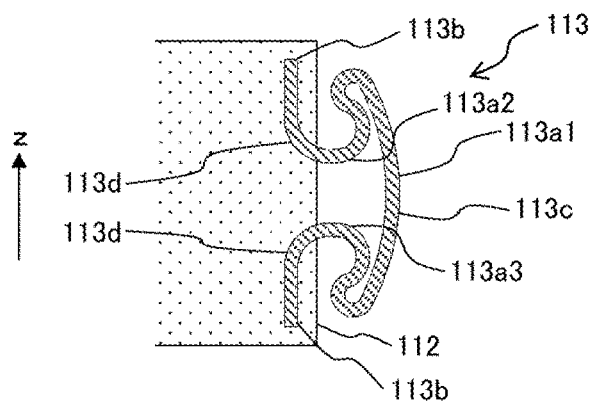
FIG. 8 is a cross-sectional view illustrating a cross section of the rotor core 111 according to Modified Example 4 in the vicinity of the elastic member 113.

Next, a modified example (Modified Example 4) of the elastic member 113 will be described with reference to FIG. 8. FIG. 8 is a cross-sectional view illustrating a cross section of the rotor core 111 according to Modified Example 4 in the vicinity of the elastic member 113.

In the present example, the configuration of the elastic member 113 is different from that of Modified Example 1 of FIGS. 4 and 5. Other configurations are the same as those of Modified Example 1 illustrated in FIGS. 4 and 5. The same reference signs are given to the same configurations as those of the above-described example and modified examples, and redundant description will be omitted. In a case where there are different configurations even with the same reference signs, the different configurations will be described.

The elastic member 113 of the present example is provided with a bent part 113a1 (second bent part) and a bent part 113a2 (third bent part) between the bent part (first bent part) 113a and the embedded part 113d with respect to the elastic member 113 of FIGS. 4 and 5. The second bent part 113a1 is provided on one end side of the elastic member 113 with respect to the first bent part 113a, and the third bent part 113a2 is provided on the other end side of the elastic member 113 with respect to the first bent part 113a.

That is, the bent part of the elastic member 113 is constituted by the plurality of the bent parts 113a, 113a1, and 113a2. This expands a deformable region and enables improvement in removal force and improvement in insertability.

The configuration related to the bent parts 113a, 113a1, and 113a2 of the present example can be applied to the elastic member 113 illustrated in FIGS. 2 to 7.

Modified Example 5

Figure 9:
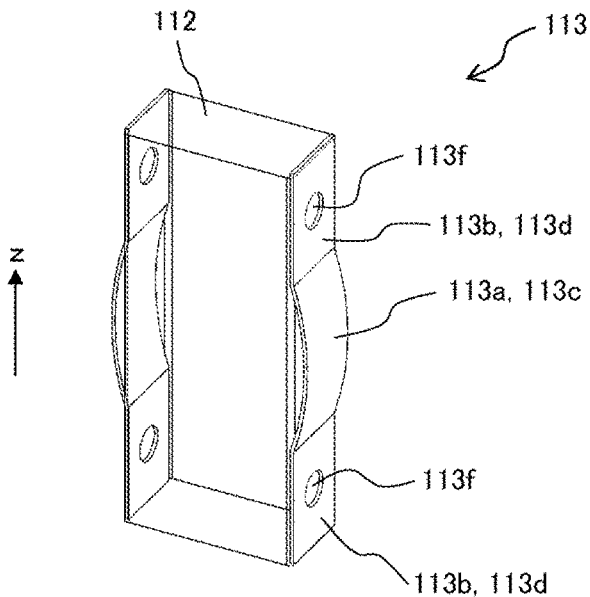
FIG. 9 is a perspective view illustrating a configuration in the vicinity of the bonded magnet 112 and the elastic member 113 according to Modified Example 5.

Next, a modified example (Modified Example 5) of the elastic member 113 will be described with reference to FIG. 9. FIG. 9 is a perspective view illustrating a configuration in the vicinity of the bonded magnet 112 and the elastic member 113 according to Modified Example 5.

In the present example, the configuration of the elastic member 113 is different from that of Modified Example 1 of FIGS. 4 and 5. Other configurations are the same as those of Modified Example 1 illustrated in FIGS. 4 and 5. The same reference signs are given to the same configurations as those of the above-described example and modified examples, and redundant description will be omitted. In a case where there are different configurations even with the same reference signs, the different configurations will be described.

In the present example, the elastic member 113 has the extension parts 113b extending in the axis direction z at both ends, and the extension part 113b is provided with a pit 113f to constitute the embedded part 113d embedded in the bonded magnet 112. Since the extension part 113b is embedded in the bonded magnet 112, the material of the bonded magnet 112 is filled in the pit 113f, and the elastic member 113 is firmly fixed to the bonded magnet 112.

In the present example, the extension part 113b extending in the axis direction can increase the contact surface with the bonded magnet 112, reduce stress concentration, and prevent cracking and peeling of the bonded magnet 112.

The configuration related to the pit 113f provided in the extension part 113b of the present example can be applied to the embedded part 113d of the elastic member 113 illustrated in FIGS. 2 to 8.

Modified Example 6

Figure 10:
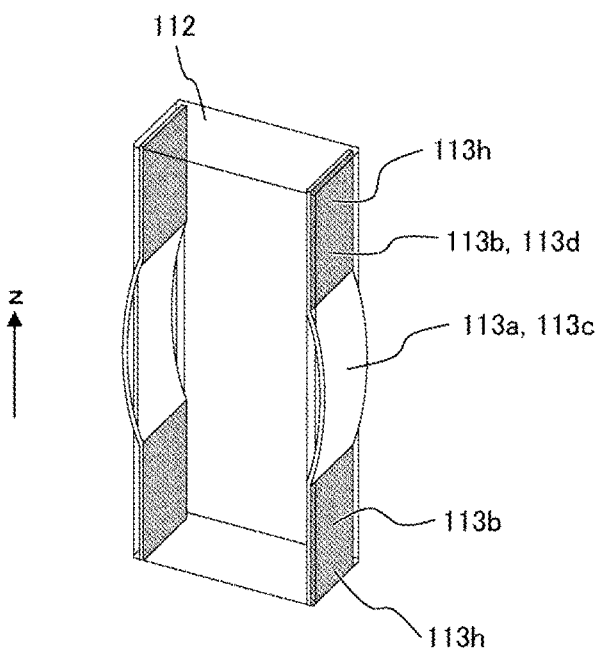
FIG. 10 is a perspective view illustrating a configuration in the vicinity of the bonded magnet 112 and the elastic member 113 according to Modified Example 6.

Next, a modified example (Modified Example 6) of the elastic member 113 will be described with reference to FIG. 10. FIG. 10 is a perspective view illustrating a configuration in the vicinity of the bonded magnet 112 and the elastic member 113 according to Modified Example 6.

In the present example, the configuration of the extension part 113b of the elastic member 113 is different from that of Modified Example 5 of FIG. 9. Other configurations are the same as those of the modified example illustrated in FIG. 9. The same reference signs are given to the same configurations as those of the above-described example and modified examples, and redundant description will be omitted. In a case where there are different configurations even with the same reference signs, the different configurations will be described.

In the present example, the elastic member 113 has the extension parts 113b extending in the axis direction z at both ends, and surface treatment 113g for improving the degree of close contact with the bonded magnet 112 is applied to the extension part 113b, and the extension part 113b constitutes the embedded part 113d embedded in the bonded magnet 112. The surface treatment 113g is treatment for increasing the surface roughness of the elastic member 113, for example, and increasing the contact area with the material of the bonded magnet 112.

The surface treatment 113g applied to the elastic member 113 improves the frictional force between the bonded magnet 112 and the elastic member 113, and can firmly fix the elastic member 113 and the bonded magnet 112.

The configuration related to the surface treatment 113g of the present example can be applied to the embedded part 113d of the elastic member 113 illustrated in FIGS. 2 to 9.

Modified Example 7

Figure 11:
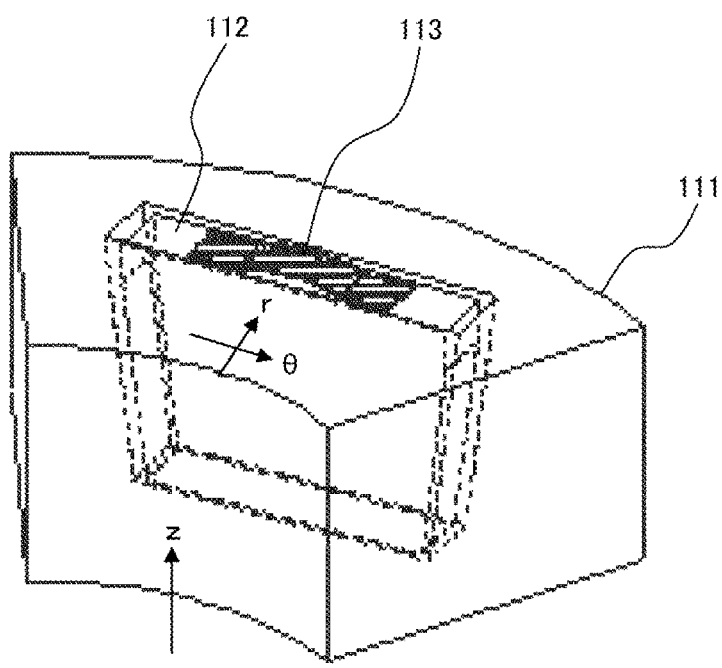
FIG. 11 is a transparent perspective view illustrating an inside of the rotor core 111 according to Modified Example 7 in a partially cut-out manner in the circumferential direction.
Figure 12:
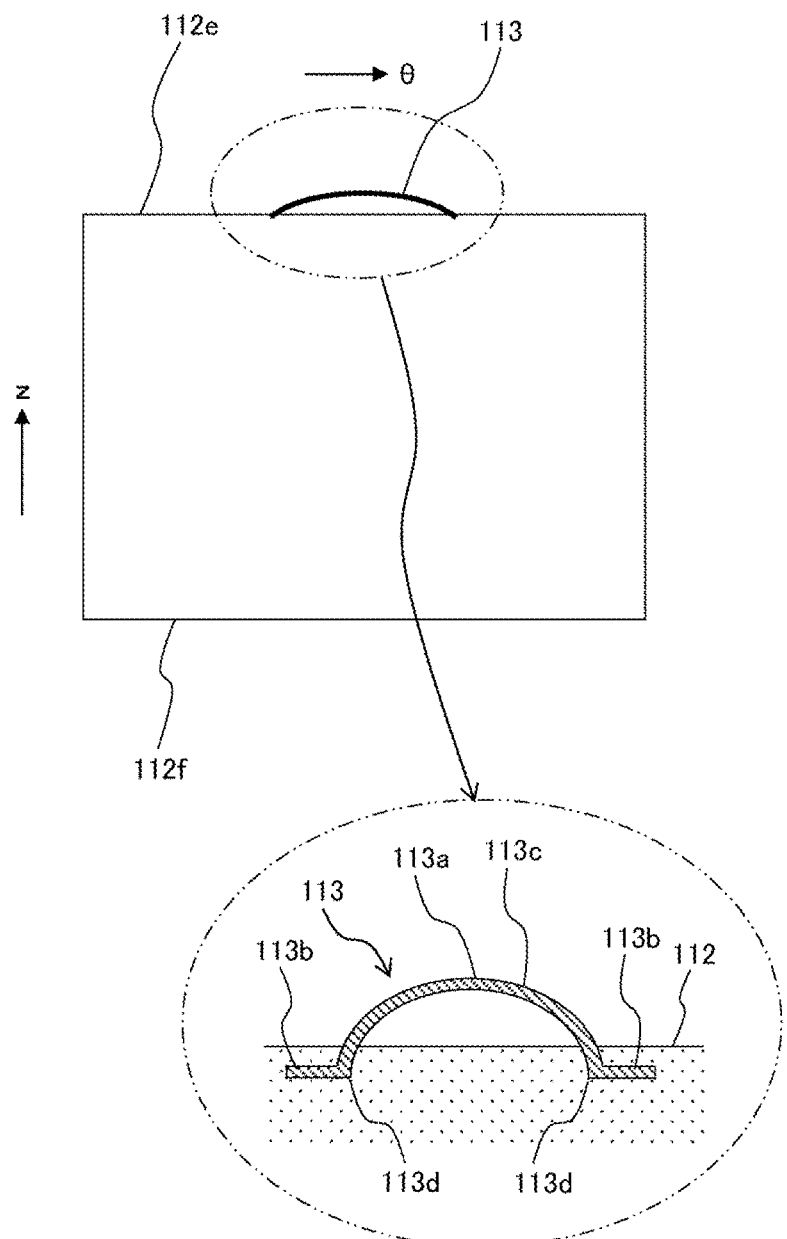
FIG. 12 is an external view of the bonded magnet 112 as viewed from a radially inside.
Figure 13:
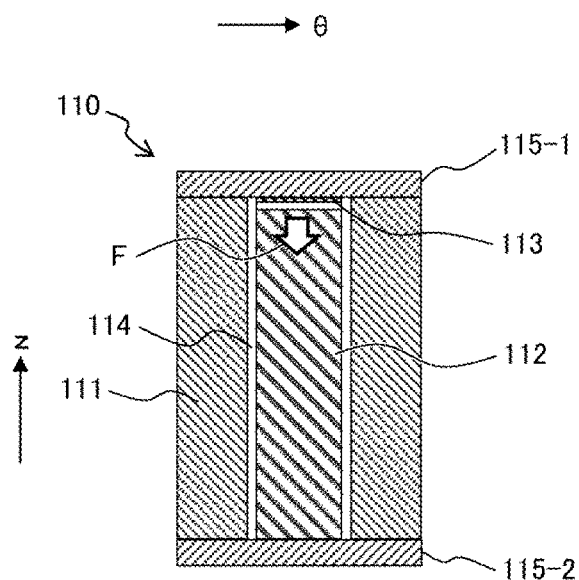
FIG. 13 is a schematic view illustrating a cross section of the rotor core 111 in the vicinity of the bonded magnet 112.

Next, a modified example (Modified Example 7) of the elastic member 113 will be described with reference to FIGS. 11, 12, and 13. FIG. 11 is a transparent perspective view illustrating an inside of the rotor core 111 according to Modified Example 7 in a partially cut-out manner in the circumferential direction. FIG. 12 is an external view of the bonded magnet 112 as viewed from a radially inside. FIG. 13 is a schematic view illustrating a cross section of the rotor core 111 in the vicinity of the bonded magnet 112.

In the present example, the arrangement of the elastic member 113 is different from that in the above-described example and modified examples. Other configurations can be configured similarly to those of the above-described examples and modified examples. The same reference signs are given to the same configurations as those of the above-described example and modified examples, and redundant description will be omitted. In a case where there are different configurations even with the same reference signs, the different configurations will be described.

In the present example, the elastic member 113 is disposed on end surfaces 112e and 112f in the axis direction z of the bonded magnet 112. The elastic member 113 may be provided on the both end surfaces 112e and 112f in the axis direction z, but is only required to be provided on any one of the both end surfaces 112e and 112f.

The rotor 110 is provided with the end plates 115-1 and 115-2 for holding the rotor core 111. The end plates 115-1 and 115-2 are provided on both end surfaces in the axis direction of the rotor core 110. As illustrated in FIG. 13, by disposing the elastic member 113 on the end surfaces 112e and 112f in the axis direction z of the bonded magnet 112, the bonded magnet 112 receives pressing force F from the end plates 115-1 and 115-2 and is fixed inside the magnet storage part 114.

In the present example, it is needless to say that the configuration described in the above-described example and modified examples can be adopted as the configuration of the elastic member 113.

Modified Example 8

Figure 14:
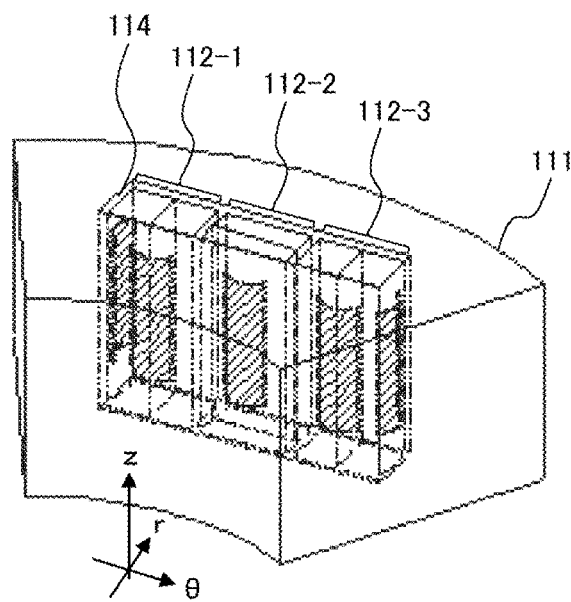
FIG. 14 is a transparent perspective view illustrating an inside of the rotor core 111 according to Modified Example 8 in a partially cut-out manner in the circumferential direction.
Figure 15:
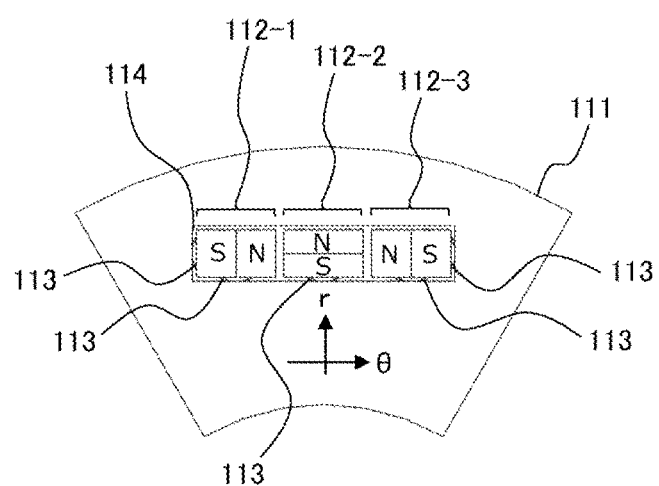
FIG. 15 is a top view of the rotor core 111 illustrated in FIG. 14.

Next, a modified example (Modified Example 8) of the bonded magnet 112 and the elastic member 113 will be described with reference to FIGS. 14 and 15. FIG. 14 is a transparent perspective view illustrating an inside of the rotor core 111 according to Modified Example 8 in a partially cut-out manner in the circumferential direction. FIG. 15 is a top view of the rotor core 111 illustrated in FIG. 14.

In the present example, the arrangement of the elastic member 113 is different from that in the above-described example and modified examples. Other configurations can be configured similarly to those of the above-described examples and modified examples. The same reference signs are given to the same configurations as those of the above-described example and modified examples, and redundant description will be omitted. In a case where there are different configurations even with the same reference signs, the different configurations will be described.

In the present example, the bonded magnet 112 is divided into a plurality of magnet members 112-1, 112-2, and 112-3, and the plurality of divided magnet members 112-1, 112-2, and 112-3 are each embedded with the elastic member 113 and are stored in one magnet storage part 114. In the present example, the Halbach arrangement is achieved by the plurality of divided magnet members 112-1, 112-2, and 112-3, two elastic members 113 are embedded in the magnet member 112-1, one elastic member 113 is embedded in the magnet member 112-2, and two elastic members 113 are embedded in the magnet member 112-3.

By dividing the bonded magnet 112 in the magnet storage part 114, it is possible to change the orientation of the divided magnet members 112-1, 112-2, and 112-3. Therefore, in the present example, it is possible to achieve a special magnet arrangement such as the Halbach arrangement, which is a magnet arrangement in which the magnet magnetic flux is sinusoidal.

[Example of Manufacturing Method of Bonded Magnet]

Figure 16:
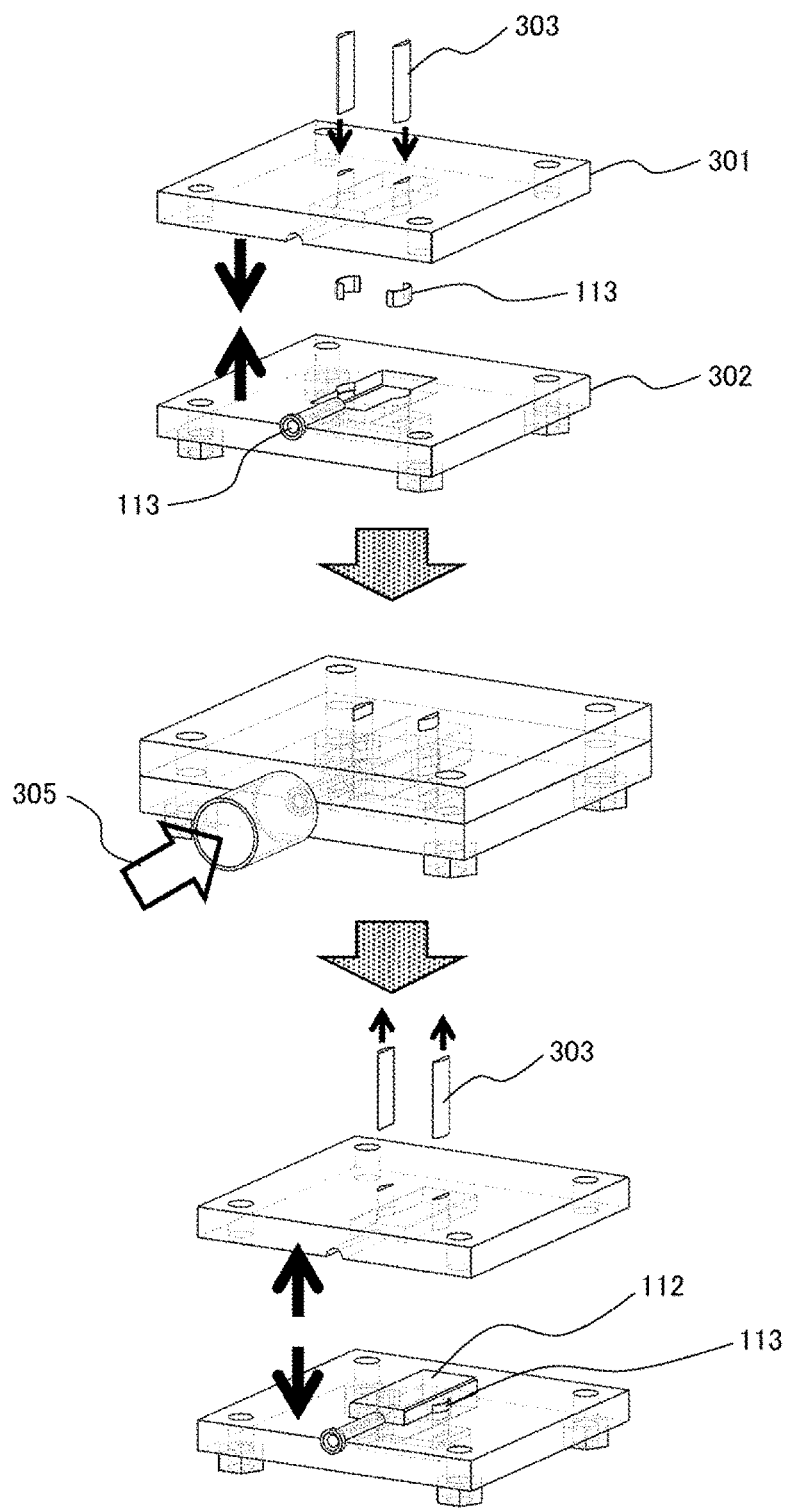
FIG. 16 is an explanatory view of an injection molding method for the bonded magnet 112.

A method for molding, by injection molding, the bonded magnet 112 in which the elastic member 113 is embedded will be described with reference to FIG. 16. FIG. 16 is an explanatory view of an injection molding method for the bonded magnet 112.

The bonded magnet 112 in which the elastic member 113 is embedded according to the present invention is poured and molded from an injection molding nozzle 304 into a mold in which an upper mold 301 and a lower mold 302 are combined in a state where a bonded magnet material 305 in which a bonding material (resin) and magnet powder are mixed is melted. At this time, the elastic member 113 is placed in the molds 301 and 302, and a part (embedded part) 112d of the elastic member 113 is embedded in the bonded magnet material to be injected into the mold. The elastic member 113 is pressed with a jig 303 so that the elastic member 113 does not move in the molds 301 and 302.

After the bonded magnet material 305 is cooled in the mold, the jig 303 is retracted from the mold, the upper mold 301 and the lower mold 302 are separated, and the bonded magnet 112 having been molded is taken out.

In the present example, using the molds 301 and 302, it is possible to manufacture a large amount of bonded magnets 112 having a desired shape and in which the elastic member 113 is embedded.

[Example of Electric Vehicle Equipped with Rotating Electrical Machine 100]

Figure 17:
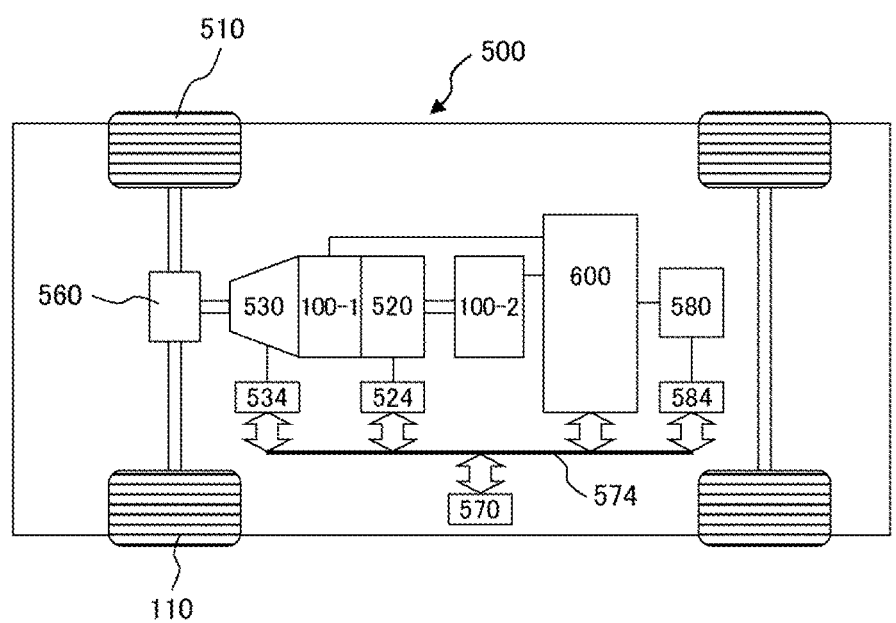
FIG. 17 is a view illustrating a schematic configuration of a hybrid electric vehicle equipped with the rotating electrical machine 100 according to an example of the present invention.

An electric vehicle equipped with the rotating electrical machine 100 according to the present invention will be described with reference to FIG. 17. FIG. 17 is a view illustrating a schematic configuration of a hybrid electric vehicle equipped with the rotating electrical machine 100 according to an example of the present invention.

The rotating electrical machine 100 according to the present example can be applied to a pure electric vehicle that travels by power of only the rotating electrical machine or a hybrid electric vehicle that is driven by both an engine and the rotating electrical machine, but hereinafter, a hybrid electric vehicle will be described as an example.

A vehicle 500 is equipped with an engine 520, a first rotating electrical machine 100-1, a second rotating electrical machine 100-2, and a battery 580. In a case where a drive force by the first rotating electrical machine 100-1 or the second rotating electrical machine 100-2 is required for the vehicle 500, the battery 580 supplies direct-current power to the first rotating electrical machine 100-1 or the second rotating electrical machine 100-2 via a power conversion device 600. The battery 580 receives direct-current power from the first rotating electrical machine 100-1 or the second rotating electrical machine 100-2 during regenerative traveling. Transmission and reception of direct-current power between the battery 580 and the first rotating electrical machine 100-1 or the second rotating electrical machine 100-2 are performed via the power conversion device 600. Although not illustrated, the vehicle 500 is equipped with a battery that supplies low voltage power (for example, 14 volt system power), and supplies direct-current power to a control circuit described below.

The first rotating electrical machine 100-1 and the second rotating electrical machine 100-2 have substantially the same structure, and can be configured by the rotating electrical machine 100 described above.

Rotational torque generated by the engine 520 and the first rotating electrical machine 100-1 or the second rotating electrical machine 100-2 is transmitted to a front wheel 510 via a transmission 530 and a differential gear 560. The transmission 530 is controlled by a transmission control device 534. The engine 520 is controlled by an engine control device 524. The battery 580 is controlled by a battery control device 584. The transmission control device 534, the engine control device 524, the battery control device 584, the power conversion device 600, and an integration control device 570 are connected to one another via a communication line 574.

The integration control device 570 is a control device higher than the transmission control device 534, the engine control device 524, the power conversion device 600, and the battery control device 584, and receives information representing the state of each of the transmission control device 534, the engine control device 524, the power conversion device 600, and the battery control device 584 from them via the communication line 574. The integration control device 570 calculates a control command to each device based on those pieces of information having been acquired. The calculated control command is transmitted to each device via the communication line 574.

The battery 580 includes a secondary battery such as a lithium ion battery or a nickel hydrogen battery, and outputs high-voltage direct-current power of 250 V to 600 V or higher. The battery control device 584 outputs the charge/discharge status of the battery 580 and the state of each unit cell battery constituting the battery 580 to the integration control device 570 via the communication line 574.

Upon determining that charge of the battery 580 is necessary based on the information from the battery control device 584, the integration control device 570 issues, to the power conversion device 600, an instruction for power generation operation. The integration control device 570 mainly performs management of pieces of output torque of the engine 520, the first rotating electrical machine 100-1, and the second rotating electrical machine 100-2, and calculation processing of the total torque and the torque distribution ratio of the output torque of the engine 520 and the pieces of output torque of the first rotating electrical machine 100-1 and the second rotating electrical machine 100-2, and transmits a control command based on this calculation processing result to the transmission control device 534, the engine control device 524, and the power conversion device 600. The power conversion device 600 controls the first rotating electrical machine 100-1 and the second rotating electrical machine 100-2 so as to generate torque output or generated power according to the command based on the torque command from the integration control device 570.

The power conversion device 600 is provided with a power semiconductor constituting an inverter circuit for operating the first rotating electrical machine 100-1 and the second rotating electrical machine 100-2. The power conversion device 600 controls switching operation of the power semiconductor based on a command from the integration control device 570. By the switching operation of this power semiconductor, the first rotating electrical machine 100-1 and the second rotating electrical machine 100-2 are operated as electric motors or generators.

When the first rotating electrical machine 100-1 and the second rotating electrical machine 100-2 are operated as electric motors, direct-current power from the high-voltage battery 580 is supplied to a direct-current terminal of the inverter of the power conversion device 600. The power conversion device 600 controls switching operation of the power semiconductor, converts the supplied direct-current power into three-phase alternating-current power, and supplies the converted power to the first rotating electrical machine 100-1 and the second rotating electrical machine 100-2. On the other hand, when the first rotating electrical machine 100-1 and the second rotating electrical machine 100-2 are operated as generators, the rotors of the first rotating electrical machine 100-1 and the second rotating electrical machine 100-2 are rotationally driven by rotational torque applied from the outside, and three-phase alternating-current power is generated in the stator windings of the first rotating electrical machine 100-1 and the second rotating electrical machine 100-2. The generated three-phase alternating-current power is converted into direct-current power by the power conversion device 600, and this direct-current power is supplied to the battery 580, whereby the high-voltage battery 180 is charged.

In the rotating electrical machine 100 of the present example, it is possible to suppress a decrease in strength of the rotor core 111 and to achieve a high rotation speed. As a result, the rotating electrical machine 100 of the present example can be downsized by increasing the high rotation speed. The rotating electrical machine 100 of the present example can be reduced in size and cost, and is suitable for application to a motor for an automobile main machine. In a case where the rotating electrical machine 100 of the present example is applied to a motor for an automobile main machine, from the viewpoint of e-Axle (traction unit integrated with motor, inverter, and reducer), not only the degree of freedom of arrangement inside the vehicle increases due to downsizing of the motor, but also variations of the system such as a two-motor system can be increased.

In the present example, the rotating electrical machine 100 having the stator 130 having the stator core 132 and the rotor 110 rotatably arranged on the inner peripheral side of the stator core 132 via a gap is preferably provided as an electrical drive system including the first rotating electrical machine 100-1, the second rotating electrical machine 100-2, and the power conversion device 600, and the rotor 110 of the rotating electrical machine described in the above-described example and modified examples is preferably provided as the rotor 110 of the rotating electrical machine 100.

The present invention is not limited to the above example, and various modified examples are possible.

For example, the above-described example has been described in detail in order to describe the present invention in an easy-to-understand manner, and the present invention is not necessarily limited to an aspect including all the described configurations. A part of the configuration of the example can be deleted or another configuration can be added.

REFERENCE SIGNS LIST 100 rotating electrical machine
110 rotor
111 rotor core
112 bonded magnet
112-1, 112-2, 112-3 plurality of magnet members of bonded magnet 112
112$a$ end surface of radially inner peripheral side of bonded magnet 112
112$c$, 112$d$ both end surfaces in circumferential direction of bonded magnet 112
112$e$, 112$f$ end surface in axis direction z of bonded magnet 112
113 elastic member
113*a*, 113*a*1, 113*a*2 bent part of elastic member 113
113*b* extension part of elastic member 113
113*c* exposed part of elastic member 113
113*d* embedded part of elastic member 113
113*g* surface treatment of elastic member 113
114 magnet storage part
114*a*, 114*b*, 114*c*, 114*d* inner wall of magnet storage part 114
z axis direction

The invention claimed is:

1. A rotor of a rotating electrical machine comprising:
a bonded magnet; an elastic member having a bent part; and a rotor core provided with a magnet storage part that stores the bonded magnet and the elastic member,
wherein the elastic member is embedded in the bonded magnet in a state where at least an exposed part of the bent part is exposed from the bonded magnet, and
the exposed part of the bent part from the bonded magnet comes into contact with an inner wall of the magnet storage part and is elastically deformed.

2. The rotor of a rotating electrical machine according to claim 1, wherein
the bent part has a bend in an axis direction, in a horizontal cross section perpendicular to the axis direction, or in both the axis direction and the horizontal cross section.

3. The rotor of a rotating electrical machine according to claim 1, wherein
the elastic member has, at both ends, extension parts extending in an axis direction inside the bonded magnet.

4. The rotor of a rotating electrical machine according to claim 1, wherein
the elastic member includes the exposed part including at least a part of the bent part and exposed to an outside of the bonded magnet, and an embedded part embedded in the bonded magnet, and
the embedded part extends in one direction inside the bonded magnet.

5. The rotor of a rotating electrical machine according to claim 1, wherein
one end of the elastic member is embedded in the bonded magnet, and an other end is exposed to an outside of the bonded magnet.

6. The rotor of a rotating electrical machine according to claim 1, wherein
the bent part of the elastic member includes a plurality of bent parts.

7. The rotor of a rotating electrical machine according to claim 1, wherein
the elastic member has extension parts extending in an axis direction at both ends, and
the extension part constitutes an embedded part provided with a pit and embedded in the bonded magnet.

8. The rotor of a rotating electrical machine according to claim 1, wherein
the elastic member has extension parts extending in an axis direction at both ends, and
surface treatment for improving a degree of close contact with the bonded magnet is applied to the extension part, and the extension part constitutes an embedded part embedded in the bonded magnet.

9. The rotor of a rotating electrical machine according to claim 1, wherein
the elastic member is disposed on an end surface on a radially inner peripheral side of the bonded magnet and on both end surfaces in a circumferential direction.

10. The rotor of a rotating electrical machine according to claim 1, wherein
the elastic member is disposed on an axial end surface of the bonded magnet.

11. The rotor of a rotating electrical machine according to claim 1, wherein
the bonded magnet is divided into a plurality of magnet members, and
the plurality of magnet members having been divided are each embedded with the elastic member, and are stored in one magnet storage part.

12. An electrical drive system comprising: as power for driving, a rotating electrical machine including a stator having a stator core and a rotor rotatably disposed on an inner peripheral side of the stator core via a gap; and
as a rotor of the rotating electrical machine, a rotor of the rotating electrical machine according to claim 1.

* * * * *